United States Patent [19]

Galos

[11] Patent Number: 4,655,108

[45] Date of Patent: Apr. 7, 1987

[54] TUBE-SQUARING TOOL AND CLAMPING MECHANISM

[75] Inventor: Imre G. Galos, Downers Grove, Ill.

[73] Assignee: The E. H. Wachs Company, Wheeling, Ill.

[21] Appl. No.: 776,353

[22] Filed: Sep. 16, 1985

[51] Int. Cl.[4] ............................. B23B 5/16; B25B 5/08
[52] U.S. Cl. ..................................... 82/38 R; 82/4 C; 81/53.2; 269/236; 403/350
[58] Field of Search ............... 82/4 C, 38 R; 269/236, 269/204, 235, 229; 403/350; 81/53.2

[56] References Cited

U.S. PATENT DOCUMENTS

| | | | |
|---|---|---|---|
| 1,214,985 | 2/1917 | Barber | 403/350 |
| 3,051,059 | 8/1962 | Davey | 90/12 |
| 3,228,268 | 1/1966 | Strout | 77/73 |
| 3,537,341 | 11/1970 | Zahuranec et al. | 82/4 |
| 3,825,359 | 7/1974 | Fulton | 403/350 |
| 3,875,831 | 4/1975 | Beauloye | 82/4 C |
| 4,114,484 | 9/1978 | Feamster, III | 82/4 C |
| 4,315,585 | 2/1982 | Seitz | 269/236 |
| 4,319,503 | 3/1982 | Saine et al. | 82/4 C |
| 4,569,257 | 2/1986 | Hess | 81/53.2 |

Primary Examiner—Leonidas Vlachos
Attorney, Agent, or Firm—Wood, Dalton, Phillips, Mason & Rowe

[57] ABSTRACT

A tube-squaring tool and a clamping mechanism for clamping a workpiece by only a partial revolution of a cam ring to provide quick and easy clamping and unclamping of a workpiece with respect to the body of the tube-squaring tool to which the clamping mechanism is connected. The tube-squaring tool body mounts a motor centrally thereof to facilitate handling of the tube-squaring tool and the cutting action is performed by advancing a tool shaft relative to the body by operation of a handle pivotally mounted adjacent an end of the body of the tube-squaring tool.

The clamping mechanism has a cam ring movable between a first position to permit endwise insertion and removal of a tubular member and a second position to bind the tubular member in associated structure. A spring provides a certain amount of tolerance and yieldability to the clamping force applied by the cam ring.

3 Claims, 4 Drawing Figures

TUBE-SQUARING TOOL AND CLAMPING MECHANISM

BACKGROUND OF THE INVENTION

This invention pertains to a tube-squaring tool and a clamping mechanism usable therewith.

Prior to welding adjacent tube sections together in end-to-end relation, it is important to remove burrs and rough edges from the tube end and also to have a very square tube end when the welding is done by an automatic butt welder which provides a fusion weld.

Portable tools for finishing the ends of metal tubes are known in the art.

The Strout Pat. No. 3,228,268 shows a portable tube end cutting tool for preparing the end of a metal pipe or tube preparatory to welding. This patent has a hand crank operable to achieve advance of a rotating cutting tool relative to the end of a metal tube and a collet for holding the metal tube in position during cutting.

The Beauloye Pat. No. 3,875,831 discloses a pipe facing and deburring power head with a complex automatic structure for advancing a cutting tool toward a workpiece and a plurality of clamping screws for holding the workpiece in position.

The Saine Pat. No. 4,319,503 shows a tube facing tool with a collet structure for holding a workpiece in position and a rotatable cam structure for causing movement of a sleeve which results in movement of a rotating cutting tool relative to the workpiece.

The prior art referred to above does not show a tube-squaring tool having clamping mechanism operable simply and quickly by a relatively few degrees of rotation of a handle nor a structure wherein a drive motor is mounted intermediate the ends of the body of the tool to provide a compact tool and an optional handle facilitating handling of the tube-squaring tool and wherein the advance of the cutting tool relative to the workpiece is achieved by operation of a member pivotally mounted at an end of the tool body.

SUMMARY OF THE INVENTION

Primary features of the invention are to provide a new and improved tube-squaring tool enabling easier and faster operation in squaring the end of a tube and to provide a clamping mechanism usable with the tube-squaring tool and also having general utility. These results are achieved by an improved design of the tube-squaring tool which facilitates manipulation and use thereof as well as in a uniquely constructed clamping mechanism which can be operated by rotation of a handle through a portion of a revolution to either lock a tube in position for cutting or release the tube for removal after cutting.

In carrying out the foregoing, the tube-squaring tool has a body which rotatably mounts a sleeve intermediate its ends and a tool shaft extends through the sleeve and is splined thereto for rotation with the sleeve and movement longitudinally thereof. A drive motor positioned on the housing intermediate its ends is drivingly connected to the sleeve and a handle pivotally mounted at an end of the housing is operable to move a cutting tool carried on the tool shaft toward and away from a tube held in the clamping mechanism.

The clamping mechanism is rigidly connected to the body of the tube-squaring tool and has a plurality of members with openings which can be aligned in one position to permit passage of a tube therethrough. One of the members is shiftable to a second position wherein the opening of the shifted member is out of alignment with the other openings to cause frictional engagement of the metal tube by the walls of the openings which holds the tube in position during squaring of an end thereof. The shifted member is rotatable by movement of a handle connected thereto through an arc of rotation of approximately 45°.

An object of the invention is to provide a new and improved clamping mechanism for holding a metal tube in position to have the end thereof squared by a cutting tool and with the clamping mechanism having a plurality of members with aligned openings and with one of the members being rotatable to a position to have its opening out of alignment with the others to frictionally hold the metal tube in locked relation to said members.

Another object of the invention is to provide a clamping mechanism for holding a tubular member comprising, a plurality of members having aligned openings through which the tubular member extends, and means for moving one of the members to a position wherein the opening thereof is out of alignment with the other openings to exert a force urging the tubular member against the walls of the other openings.

Still another object of the invention is to provide a tube-squaring tool having a body with a central cavity with open ends, tube-holding means fixed to and in spaced relation with said body for releasably holding a tube aligned with said central cavity, a tool shaft in said central cavity and of a length to extend beyond the open ends thereof, a rotatable sleeve in said central cavity through which the tool shaft extends and which is splined to the tool shaft for rotation therewith while permitting longitudinal movement of the tool shaft relative to the sleeve, means for rotating the sleeve to rotate the tool shaft, and means engageable with an end of the tool shaft for advancing the tool shaft relative to the body and sleeve and toward the tube-holding means.

DESCRIPTION OF THE PREFERRED EMBODIMENT

Figures 1, 2:
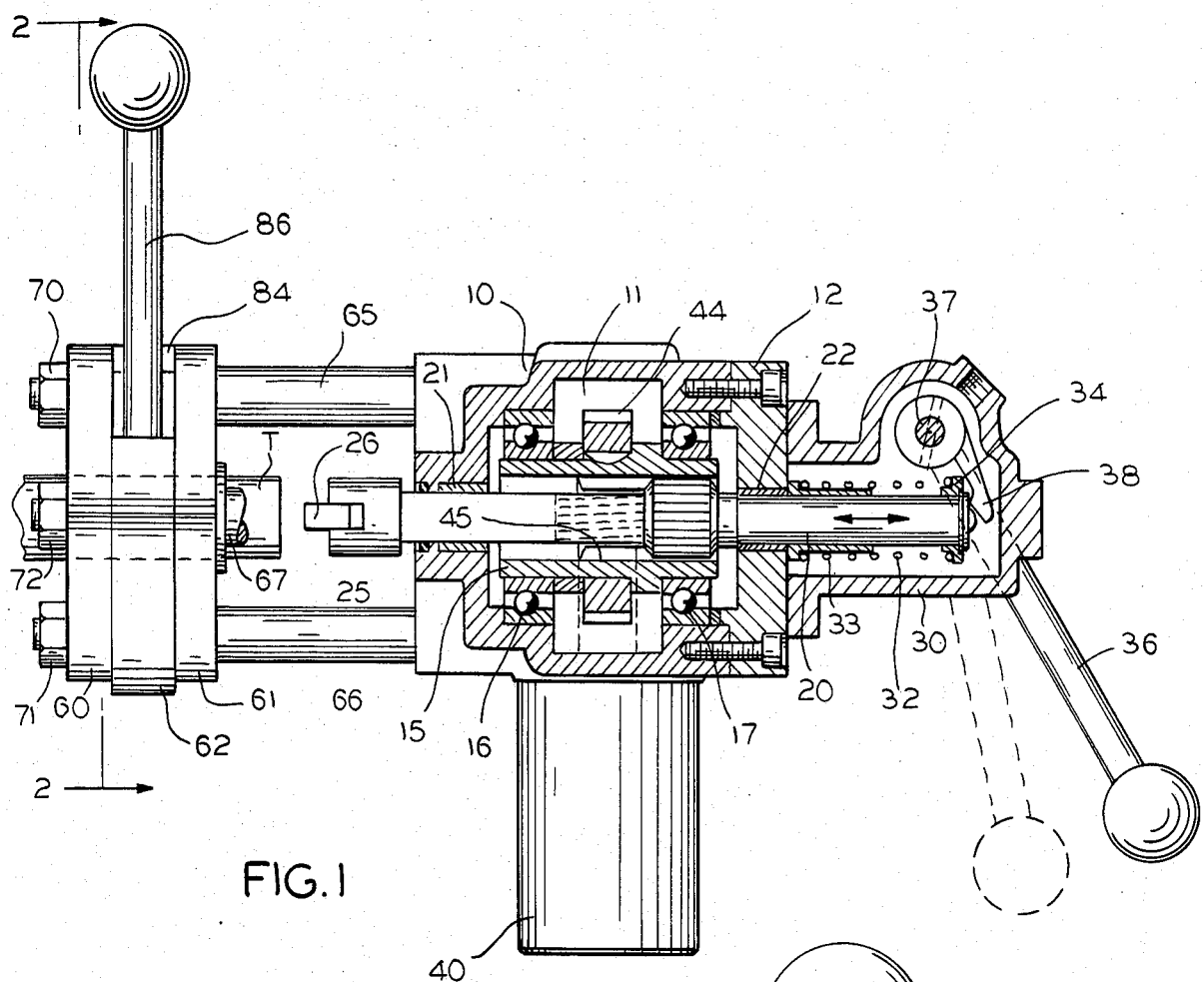
FIG. 1 is a side elevational view of the tube-squaring tool with parts thereof shown in central longitudinal section and shown in association with a tube which is to have its end squared.
FIG. 2 is a sectional view, taken generally along the line 2—2 in FIG. 1 and showing the clamping mechanism in unlocked position.

The tube-squaring tool has a body 10, with a cavity 11 open at one end and closed by an end cap 12.

A sleeve 15 is rotatably mounted within the cavity 11 by bearings 16 and 17. A tool shaft 20 extends through the sleeve 15 and is of a length to extend beyond opposite ends of the body. A pair of bushings 21 and 22 for the tool shaft are mounted at opposite ends of the housing 10. One exposed end of the tool shaft 20 mounts a cutter head 25 for holding a cutting tool 26.

The opposite end of the tool shaft 20 extends outwardly of the body 10 and is enclosed within a housing 30 fixed to the body 10. A compression spring 32 surrounds the end of the tool shaft and acts between a flanged member 33 abutting an outer face of the end cap 12 and a collar 34 positioned at an end of the tool shaft whereby the tool shaft is yieldably urged toward the right, as viewed in FIG. 1. The tool shaft can be moved toward the left, as viewed in FIG. 1, by operation of a handle 36 pivotally mounted to the housing 30 by a pivot shaft 37. An arm 38 within the housing 30 and on the pivot shaft 37 is positioned to engage an end of the tool shaft 20. Movement of the handle 36 from the full line position, shown in FIG. 1, to the broken line position will move the tool shaft 20 toward the left to bring the cutting tool 26 into engagement with a workpiece T held by clamping mechanism to be described. Return of the handle 36 to the full line position of FIG. 1 causes retraction of the tool shaft and cutting tool under the urging of the compression spring 32.

The tool shaft 20 is rotated by means of a drive motor 40 which drives a shaft 41 having a worm gear 42 within a cover 43 which meshes with a worm wheel 44 surrounding and fixed to the sleeve 15. Rotation of the sleeve 15 is imparted to the tool shaft 20 by a spline connection 45 which rotatably connects the sleeve and the tool shaft while permitting movement of the tool shaft lengthwise of the sleeve. The drive motor 40 is shaped to be grasped by the hand of a user and is located centrally of the body to provide good weight balance in handling of the tube-squaring tool.

The clamping mechanism releasably holds the workpiece T which is in the form of an elongate member and more particularly a metal tube. The clamping mechanism has a pair of spaced-apart cover members 60 and 61 of a generally triangular shape and a housing member 62 positioned therebetween, with the cover members and the housing member being held fixed to each other and to the body 10 of the tube-squaring tool by a plurality of rods 65, 66 and 67 suitably secured at one of their ends to the housing by means, not shown, and having reduced diameter threaded ends which pass through openings in the cover members 60 and 61 and the housing member 62 and which have assembly nuts 70, 71 and 72 at their ends. Each of the cover members 60 and 61 has a cylindrical opening 75 and 76 of a size to receive the largest diameter tube for which the tube-squaring tool is designed for use.

The housing member 62 has a bore 80 which is generally cylindrical in which a rotatable member 81 in the form of a cam ring can move between two operative positions. The housing member 62 is formed with a lateral opening having sides 84 and 85 to permit extension of a handle 86 therethrough, with the handle being connected to the cam ring 81. The cam ring 81 can be rotated approximately 45° between its two operative positions.

The cam ring 81 has a cylindrical opening 82 of the same size as the openings 75 and 76 of the cover members 60 and 61 and which is in alignment therewith when the clamping mechanism is in the unlocked position shown in FIG. 2. In order to closely conform the size of the cylindrical openings 75, 76 and 82 to a smaller size of tube that is to have its end squared, there are removable sleeves for the openings. The sleeves 90 and 91 for the cover members 60 and 61 are flanged at one end to provide for axial location thereof relative to the cover members and a tubular sleeve 92 is positioned within the cylindrical opening 82 of the cam ring 81.

The cam ring 81 has a contoured external periphery to enable variable location thereof within the bore 80 to achieve the locked and unlocked positions thereof. The cam ring 81 in the unlocked position has three-point contact with the wall of the bore 80 to locate the cylindrical opening 82 in alignment with the cylindrical openings 75 and 76 of the cover members, as seen in FIG. 2, to permit endwise insertion and removal of a tube T. This location is achieved by contact with the raised surfaces 95 and 96 of the cam ring and a contact at 97.

Figure 3:
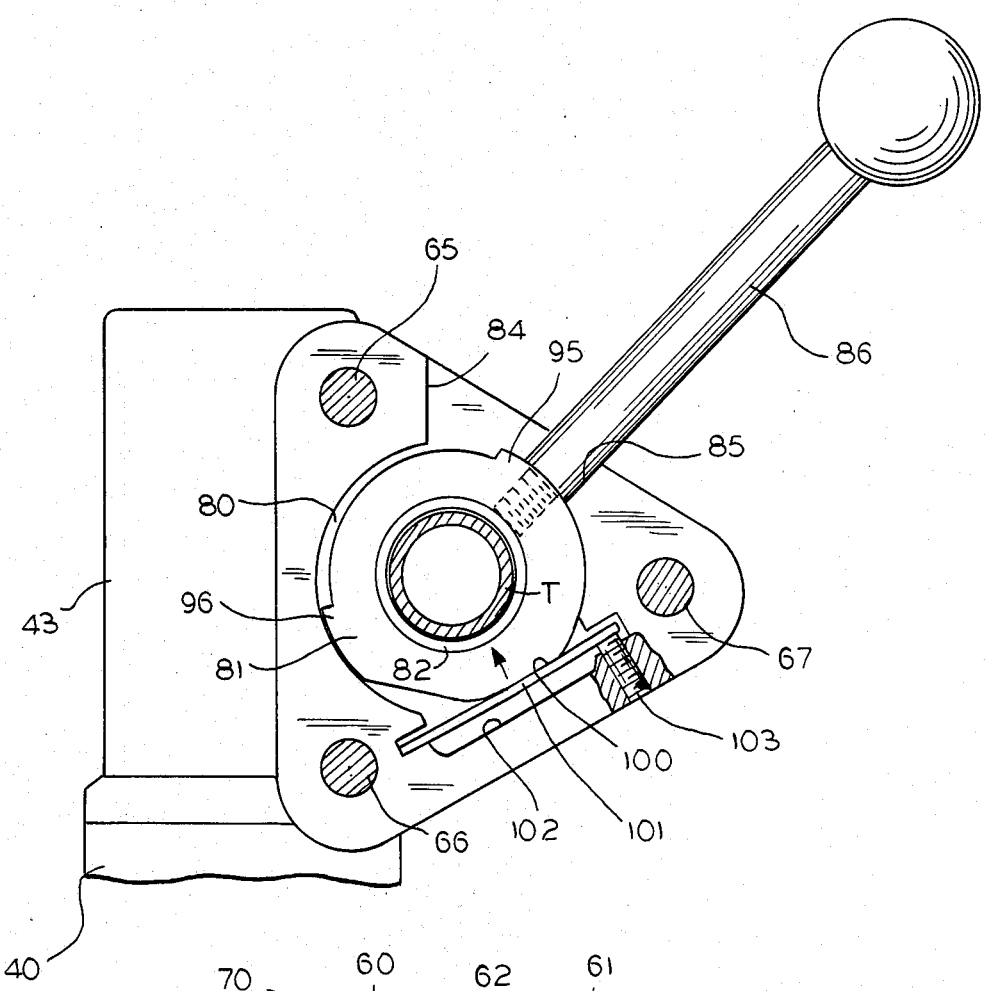
FIG. 3 is a view, similar to FIG. 2, showing the clamping mechanism in locked position.
Figure 4:
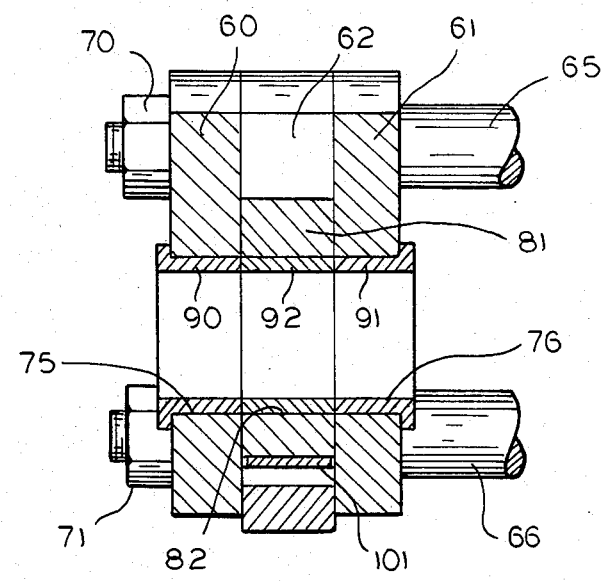
FIG. 4 is a sectional view, taken generally along the line 4—4 in FIG. 2.

When the handle 86 is actuated to rotate the cam ring 81 to the locked position, the raised surfaces 95 and 96 are shifted to permit upward movement of the cam ring as viewed in FIG. 3 without contact with the wall of the bore to have the cylindrical opening 82 move out of alignment with the cylindrical openings 75 and 76. This shifting movement of the cam ring as it is rotated is caused by moving a cam lobe 100 on the periphery of the cam ring 81 into engagement with a hardened spring 101 extending across a space 102 in the housing member 62. With the hardened spring 101 being supported only at its ends, it can have a limited amount of flexure and, thus, as the cam lobe 100, which is at an increased distance from the center of the cam ring 81 comes into contact with the hardened spring, there is a yieldable urging of the cam ring 81 upwardly to provide a certain amount of tolerance in the clamping action. This movement of the cylindrical opening 92 out of alignment with the cylindrical openings 90 and 91 in the cover members causes a force to be exerted to urge the portions of the metal tube T which are in the openings 75 and 76 against the walls thereof or against the walls of the sleeves 90 and 91 which are positioned in the openings 75 and 76. As a result, the tube T is frictionally held against movement as the end thereof is cut by the cutting tool 26. The position of the hardened spring 101 can be adjusted by a rotatable member 103 threaded in the housing 62 to control the upward force applied to a tube T that is locked in the clamping mechanism. The required force increases with the diameter of the tube that is clamped. An alternate embodiment of the clamping mechanism can use a brass plate, instead of the hardened spring 101, to provide the necessary clamping force.

The rotation of the cam ring 81 is limited by engagement of the handle 86 with either of the walls 84 or 85. The workpiece T can quickly be clamped and released by a small amount of rotation of the cam ring 81 which provides for easy and speedy use of the tube-squaring tool.

Although the clamping mechanism is disclosed in use with the tube-squaring tool, it will be recognized that the clamping mechanism is of general utility and can be used in any situation where a tubular member is to be releasably held.

I claim:

1. A clamping mechanism for releasably holding a tube in a fixed position relative to a cutting tool comprising, a housing having a bore with a lateral opening therefrom, a generally cylindrical member mounted for rotation in said bore and having a handle extending through said lateral opening, closure means associated with the housing and at each side of the bore to capture the rotatable member in said bore and having a pair of aligned openings for receiving the tube, an opening in said rotatable member, raised surfaces on said rotatable member engageable with the wall of the bore in a first position of the rotatable member to align all of said openings, and a cam lobe on said rotatable member operable in a second rotative position of the rotatable member and engageable with the wall of the bore to misalign the opening in the rotatable member with said other openings and with said raised surfaces out of engagement with the wall of the bore.

2. A clamping mechanism is defined in claim 1 including a hardened spring in said housing and which is engaged by said cam lobe to provide a limited degree of flexibility in urging the rotatable member to the second position.

3. A clamping mechanism as defined in claim 2 wherein said cam lobe has a flat surface in engagement with said hardened spring to prevent inadvertent rotation of said rotatable member.

* * * * *